US007299342B2

(12) United States Patent
Nilsson et al.

(10) Patent No.: US 7,299,342 B2
(45) Date of Patent: Nov. 20, 2007

(54) COMPLEX VECTOR EXECUTING CLUSTERED SIMD MICRO-ARCHITECTURE DSP WITH ACCELERATOR COUPLED COMPLEX ALU PATHS EACH FURTHER INCLUDING SHORT MULTIPLIER/ACCUMULATOR USING TWO'S COMPLEMENT

(75) Inventors: Anders Henrik Nilsson, Linköping (SE); Eric Johan Tell, Linköping (SE); Dake Liu, Linköping (SE)

(73) Assignee: Coresonic AB, Johanneshov (SE)

( * ) Notice: Subject to any disclaimer, the term of this patent is extended or adjusted under 35 U.S.C. 154(b) by 26 days.

(21) Appl. No.: 11/201,842

(22) Filed: Aug. 11, 2005

(65) Prior Publication Data

US 2006/0271764 A1   Nov. 30, 2006

Related U.S. Application Data

(63) Continuation-in-part of application No. 11/135,964, filed on May 24, 2005.

(51) Int. Cl.
    G06F 9/302   (2006.01)
(52) U.S. Cl. .......................... 712/222; 712/32; 712/37
(58) Field of Classification Search ...................... None
    See application file for complete search history.

(56) References Cited

U.S. PATENT DOCUMENTS

| | | | | |
|---|---|---|---|---|
| 4,760,525 | A | * | 7/1988 | Webb ............................. 712/2 |
| 5,361,367 | A | * | 11/1994 | Fijany et al. .................. 712/15 |
| 5,491,828 | A | * | 2/1996 | Intrater et al. ................ 712/35 |
| 5,805,875 | A | * | 9/1998 | Asanovic .................... 712/222 |
| 5,987,556 | A | | 11/1999 | Nakagawa et al. |
| 2003/0005261 | A1 | | 1/2003 | Sheaffer |
| 2003/0172249 | A1 | | 9/2003 | Ganapathy et al. |
| 2003/0212728 | A1 | | 11/2003 | Dagan et al. |
| 2005/0278502 | A1 | | 12/2005 | Hundley |

OTHER PUBLICATIONS

Nilsson, et al, "An accelerator structure for programmable multi-standard baseband processors," Proceedings of the IAESTED Wireless Networks Conference, Jul. 2004.
Glossner, et al, "A Multithreaded Processor Architecture for SDR," Proceedings of the Korean Institute of Communication Sciences, pp. 70-85, Nov. 2002, vol. 19, No. 11, web site ce.et.tudelft.nl/publicationfiles/625_22_sandbridge_korean_institute_paper.pdf.
Brash, "The ARM Architecture Version 6 (ARMv6)", Jan. 2002, web site.arm.com/support/White_Papers.

* cited by examiner

Primary Examiner—Kenneth S. Kim
(74) Attorney, Agent, or Firm—Meyertons Hood Kivlin Kowert & Goetzel, P.C.; Stephen J. Curran (57) ABSTRACT

A programmable digital signal processor including a clustered SIMD microarchitecture includes a plurality of accelerator units, a processor core and a complex computing unit. Each of the accelerator units may be configured to perform one or more dedicated functions. The processor core includes an integer execution unit that may be configured to execute integer instructions. The complex computing unit may be configured to execute complex vector instructions. The complex computing unit may include a first and a second clustered execution pipeline. The first clustered execution pipeline may include one or more complex arithmetic logic unit datapaths configured to execute first complex vector instructions. The second clustered execution pipeline may include one or more complex multiplier accumulator datapaths configured to execute second complex vector instructions.

34 Claims, 7 Drawing Sheets

COMPLEX VECTOR EXECUTING CLUSTERED SIMD MICRO-ARCHITECTURE DSP WITH ACCELERATOR COUPLED COMPLEX ALU PATHS EACH FURTHER INCLUDING SHORT MULTIPLIER/ACCUMULATOR USING TWO'S COMPLEMENT

This application is a continuation-in-part of prior application Ser. No. 11/135,964, filed May 24, 2005.

BACKGROUND OF THE INVENTION

1. Field of the Invention

This invention relates to digital signal processors and, more particularly, to programmable digital signal processor microarchitecture.

2. Description of the Related Art

In a relatively short period of time, the use of wireless devices and especially mobile telephones has increased dramatically. This worldwide proliferation of wireless devices has lead to a large number of emerging radio standards and a convergence of wireless products. This in turn has lead to an increasing interest in Software Defined Radio (SDR).

SDR, as described by the SDR Forum, is "a collection of hardware and software technologies that enable reconfigurable system architectures for wireless networks and user terminals. SDR provides an efficient and comparatively inexpensive solution to the problem of building multi-mode, multi-band, multi-functional wireless devices that can be enhanced using software upgrades. As such, SDR may be considered an enabling technology that is applicable across a wide range of areas within the wireless industry."

Many wireless communication devices use a radio transceiver that includes one or more digital signal processors (DSP). One type of DSP used in the radio is a baseband processor (BBP), which may handle many of the signal processing functions associated with processing of the received the radio signal and preparing signals for transmission. For example, a BBP may provide modulation and demodulation, as well as channel coding and synchronization functionality.

Many conventional BBPs are implemented as Application Specific Integrated Circuit (ASIC) devices, which may support a single radio standard. In many cases, ASIC BBPs may provide excellent performance. However, ASIC solutions may be limited to operate within the radio standard for which the on-chip hardware was designed.

To provide an SDR solution, increased flexibility may be needed in radio baseband processors to meet requirements for time to market, cost and product lifetime. To handle the requirements of demanding applications such as Wireless Local Area Networks (LAN), third/fourth generation mobile telephony, and digital video broadcasting, a large degree of parallelism may be needed in the baseband processor.

To that end, various programmable BBP (PBBP) solutions have been suggested that are typically based on highly complex, very long instruction word (VLIW) and/or multiple processor core machines. These conventional PBBP solutions may have drawbacks such as increased die area and possibly limited performance when compared to their ASIC counterparts. Thus, it may be desirable to have a programmable DSP architecture that may support a large number of different modulation techniques, bandwidth and mobility requirements, and may also have acceptable area and power consumption.

SUMMARY

Various embodiments of a programmable digital signal processor including a clustered SIMD microarchitecture are disclosed. In one embodiment, a digital signal processor includes a plurality of accelerator units, a processor core and a complex computing unit. Each of the accelerator units may be configured to perform one or more dedicated functions. The processor core includes an integer execution unit that may be configured to execute integer instructions. The complex computing unit may be configured to execute complex vector instructions. The complex computing unit may include a first and a second clustered execution pipeline. The first clustered execution pipeline may include one or more complex arithmetic logic unit datapaths configured to execute first complex vector instructions. The second clustered execution pipeline may include one or more complex multiplier accumulator datapaths configured to execute second complex vector instructions.

In one specific implementation, each data path within the clustered execution pipelines may be configured to natively interpret all data as complex valued data.

In another specific implementation, each datapath within a given clustered execution pipeline may execute a single complex operation that is part of a vector instruction per clock cycle. In addition, the integer execution unit may execute a single instruction per clock cycle concurrent with execution of any complex vector instructions executed by any of the datapaths within the first and the second clustered execution pipelines.

In yet another specific implementation, the complex computing unit may execute single instruction multiple data (SIMD) instructions.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Figure 1:
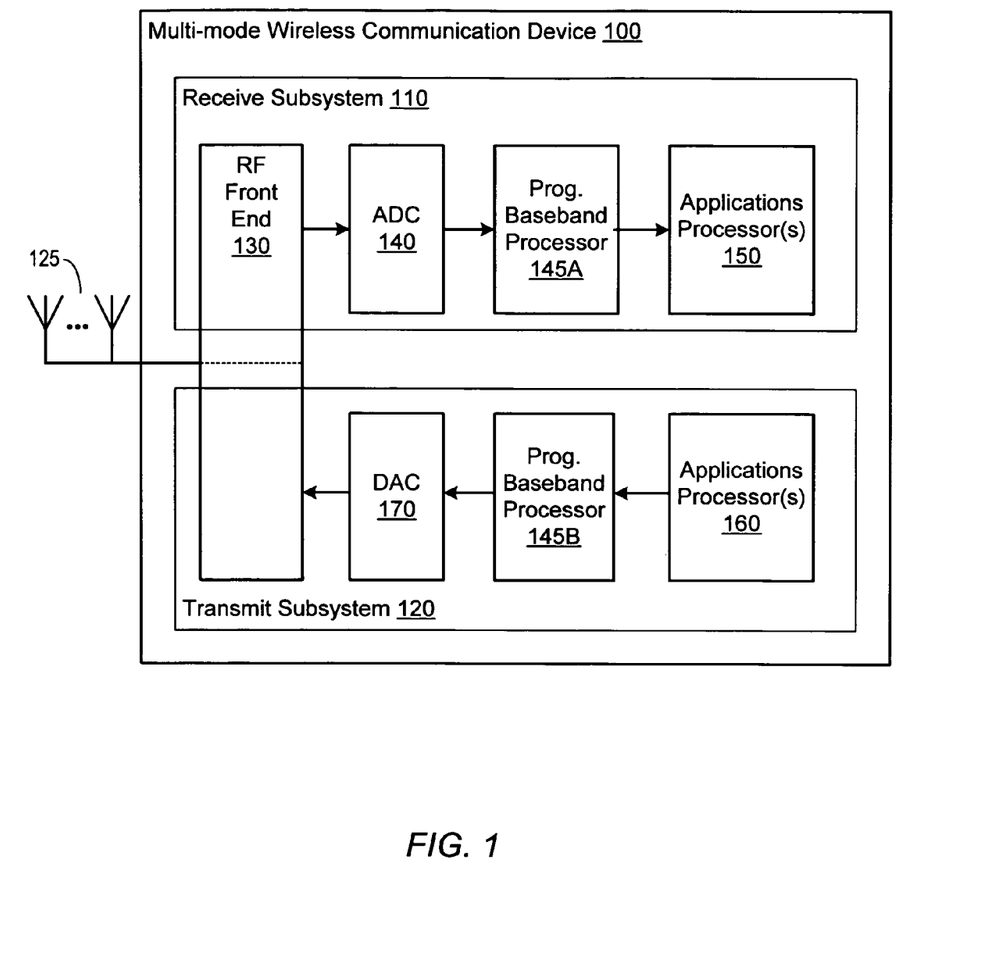
FIG. 1 is a block diagram of one embodiment of a multi-mode wireless communication device including a programmable baseband processor.

Turning now to FIG. 1, a block diagram of one embodiment of a multi-mode wireless communication device including a programmable baseband processor is shown. In the illustrated embodiment, some of the basic partitioning of a radio communication system from both functional and hardware points of view are shown. More particularly, the multimode wireless communication device 100 includes a receive subsystem 110 and a transmit subsystem 120, each of which is coupled to one or more antenna(s) 125. It is noted that in various embodiments, multimode wireless communication device may be a hand-held mobile telephony device or the like. It is further noted that components having a reference designator that includes both a number and a letter may be referred to by just the number where appropriate.

Receive subsystem 110 includes a portion of RF front end 130 that is coupled between antenna 125 and an analog-to-digital converter (ADC) 140. The ADC 140 is coupled to programmable baseband processor (PBBP) 145A, which is in turn coupled to application processor(s) 150. Transmit subsystem 120 includes applications processor(s) 160 coupled to PBBP 145B, which is coupled to digital-to-analog converter (DAC) 170. DAC 170 is also coupled to a portion of RF front end 130. It is noted that PBBP 145A and 145B may be implemented as one programmable processor and in some embodiments they may be manufactured on a single integrated circuit. It is also noted that in some embodiments ADC 140 and DAC 170 may be implemented as part of PBBP 145A. It is further noted that in other embodiments, communication device 100 may be implemented on a single integrated circuit.

PBBP 145 performs many functions in both transmit subsystem 120 and receive subsystem 110. Within transmit subsystem 120, the PBBP 145B may convert data from application sources to a format adapted to the radio channel. For example, transmit subsystem 120 may perform functions such as channel coding, digital modulation, and symbol shaping. Channel coding refers to using different methods for error correction (e.g., convolutional coding) and error detection (e.g., using a cyclic redundancy code (CRC)). Digital modulation refers to the process of mapping a bit stream to a stream of complex samples. The first (and sometimes the only) step in the digital modulation is to map groups of bits to a specific signal constellation, such as Binary Phase Shift Keying (BPSK), Quadrature Phase Shift Keying (QPSK), or Quadrature Amplitude Modulation (QAM). There are various ways of mapping groups of bits to the amplitude and phase of a radio signal. In some cases, a second step, domain translation, may be applied. In an Orthogonal Frequency Division Multiplexing (OFDM) system (i.e., a modulation method where information is sent over a large number of adjacent frequencies simultaneously), an Inverse Fast Fourier Transform (IFFT) may be used for this step. In a spread spectrum system such as Code Division Multiple Access (CDMA), for example, (a "spread spectrum" method of allowing multiple users to share the RF spectrum by assigning each active user an individual "code"), each symbol is multiplied with a spreading sequence including $\{0, +/-1\}+\{0, +/-i\}$. The final step is symbol shaping, which transforms the square wave to a band-limited signal using a digital band pass filter. Since channel coding and mapping functions typically operate on a bit level (and not on a word level), they are generally not suitable for implementation in a programmable processor. However, as will be described in greater detail below, in various embodiments of PBBP 145, these functions and others may be implemented using one or more dedicated hardware accelerators.

PBBP 145 may perform such functions as synchronization, channel equalization, demodulation, and forward error correction. For example, receive subsystem 110 may recover symbols from the distorted analog baseband signal and translate them to a bit stream with an acceptable bit error rate (BER) for applications running in applications processor(s) 150.

Synchronization may be divided into several steps. The first step may include detecting an incoming signal or frame, and is sometimes referred to as "energy detection." In connection with this, operations such as antenna selection and gain control, may also be carried out. The next step is symbol synchronization, which aims to find the exact timing of the incoming symbols. All the preceding operations are typically based on complex auto- or cross-correlations.

In many cases, it may be necessary that receive subsystem 110 perform some kind of compensation for imperfections in the radio channel. This compensation is known as channel equalization. In OFDM systems, channel equalization may involve a simple scaling and rotation of each sub-carrier after performing an FFT. In a CDMA system, a "rake" receiver is often used to combine incoming signals from multiple signal paths with different path delays. In some systems, least mean square (LMS) adaptive filters may be used. Similar to synchronization, most operations involved in channel estimation and equalization may employ convolution-based algorithms. These algorithms are generally not similar enough to share the same fixed hardware. However they may be implemented efficiently on a programmable DSP processor such as PBBP 145.

Demodulation may be thought of as the opposite operation of modulation. Demodulation typically involves performing an FFT in OFDM systems and a correlation with spreading sequence or "de-spread" in DSSS/CDMA systems. The last step of demodulation may be to convert the complex symbol to bits according to the signal constellation. Similar to channel coding, de-interleaving and channel decoding may not be suitable for firmware implementation. However, as described in greater detail below, Viterbi or Turbo decoding, which may be used for convolutional codes, are very demanding functions that may be implemented as one or more hardware accelerators.

Programmable Baseband Processor Architecture

Figure 2:
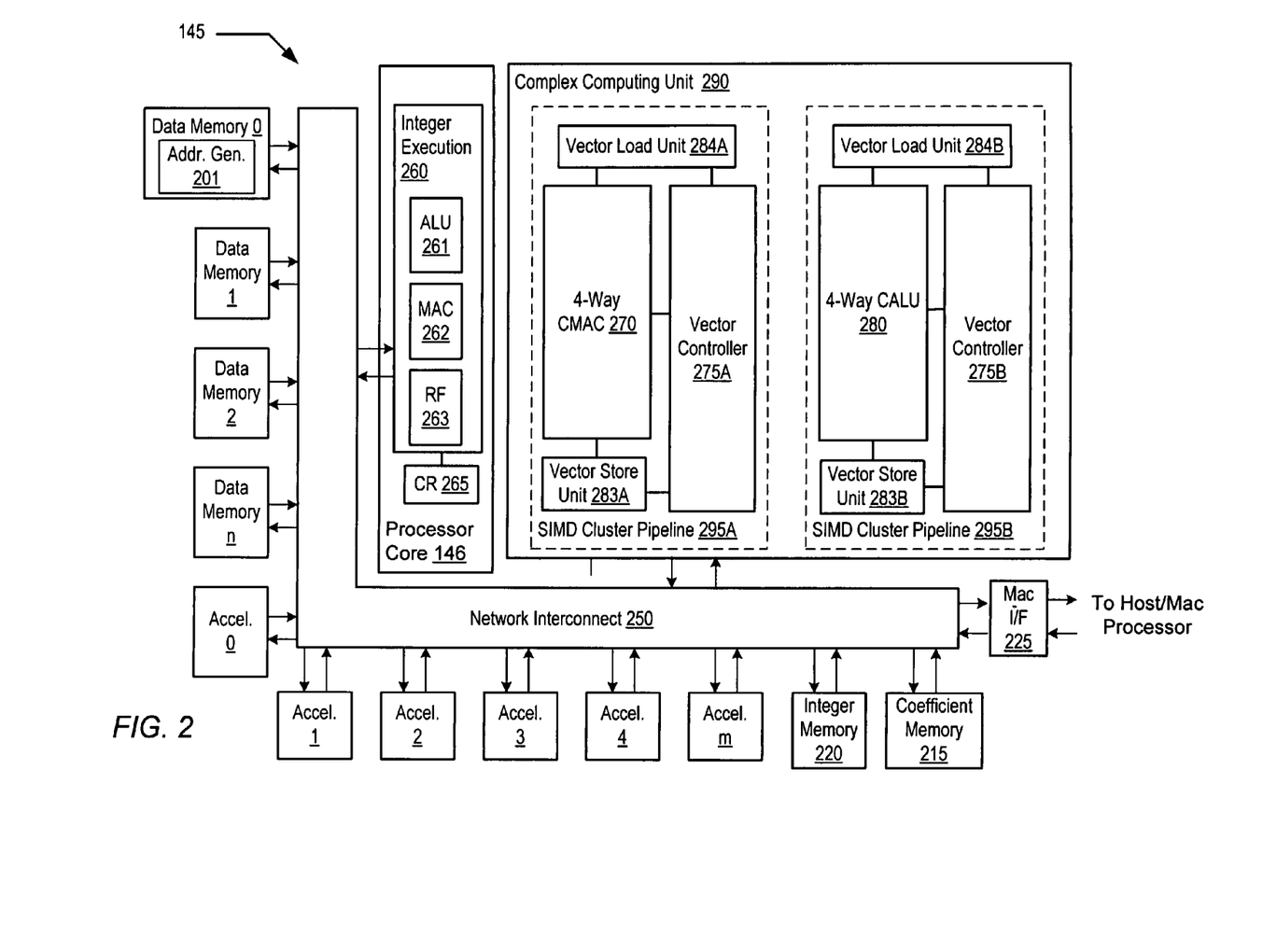
FIG. 2 is a block diagram of one embodiment of the programmable baseband processor of FIG. 1.

FIG. 2 illustrates a block diagram of one embodiment of the programmable baseband processor of FIG. 1. PBBP 145 may support different radio standards with multiple modes of operation (i.e., preamble reception, payload reception, and transmission) and different data rates, by providing dynamic reconfigurability. To achieve the desired reconfigurability, various embodiments of PBBP 145 may include a central processor core that manages the DSP flow by controlling the interconnection between the processor core, multiple memory units, and a variety of hardware accelerators using an internal network.

Referring to FIG. 2, PBBP 145 includes a processor core 146, and a complex computing unit 290. PBBP 145 also includes a plurality of data memory units designated 0 through n, where n may be any number. PBBP 145 also includes a plurality of hardware accelerators, designated 0 through m, where m may be any number. In addition, PBBP 145 includes a network interconnect 250 that is coupled between the processor core 146 and complex computing unit 290, and each of the data memories and the accelerators. Further, PBBP 145 includes integer and coefficient memory units, designated 220 and 215, respectively, each of which are coupled to the processor core 146 and complex computing unit 290 via network interconnect 250. Lastly, PBBP 145 includes a medium access layer (MAC) interface unit 225, which is coupled between network interconnect 250 and a Host/MAC processor such as applications processors 150 and 160 for example.

In the illustrated embodiment, processor core 146 includes an integer execution unit 260 that is coupled to control registers CR 265 and to network interconnect 250. Integer execution unit 260 includes an ALU 261, a multiplier accumulator unit 262 and a set of register files (RF) 263. In one embodiment, integer execution unit 260 may function as a reduced instruction set controller (RISC) configured to execute 16-bit integer instructions, for example. It is noted that in other embodiments, integer execution unit 260 may be configured to execute different sized integer instructions such as 8-bit or 32-bit instructions, for example.

In various embodiments, complex computing unit 290 may include multiple clustered single-instruction multiple-data (SIMD) execution pipelines. Accordingly, in the embodiment illustrated in FIG. 2, complex computing unit 290 includes a SIMD cluster pipeline 295A and a SIMD cluster pipeline 295B. SIMD cluster pipeline 295A includes a complex multiplier accumulator (CMAC) unit 270 and a vector controller 275A that is coupled to CMAC 270. In addition, SIMED cluster pipeline 295A includes a vector load unit (VLU) 284A and a vector store unit (VSU) 283A, each of which are coupled to CMAC 270. SIMD cluster pipeline 295B includes a complex arithmetic logic unit (CALU) 280 coupled to a vector controller 275B. SIMD cluster pipeline 295B further includes a VSU 283B, and a VLU 284B, each of which are coupled to CALU 280.

Figure 4:
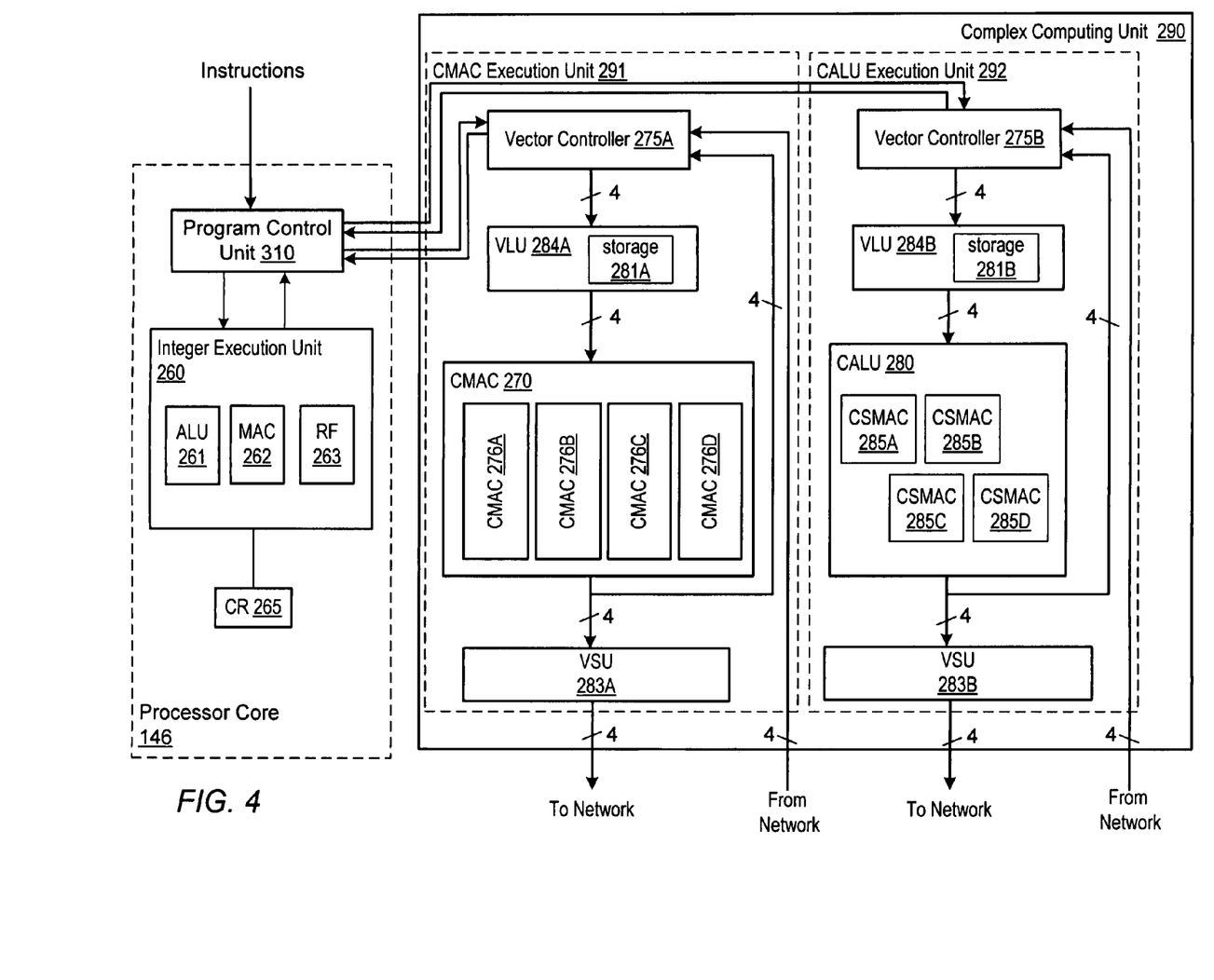
FIG. 4 is a block diagram illustrating more detailed aspects of one embodiment of the programmable baseband processor of FIG. 2.

In the illustrated embodiment, CALU 280 is shown as a four-way complex ALU that may include four independent datapaths each having a complex short multiplier-accumulator (CSMAC) (shown in FIG. 4). As will be described in greater detail below, CALU 280 may execute vector instructions. In one embodiment, CALU 280 may be particularly suited to execute complex vector instructions. Further, each of the independent datapaths of CALU 280 may concurrently execute the complex vector instructions.

CMAC 270 may be optimized for operations on vectors of complex numbers. That is to say, in one embodiment, CMAC 270 may be configured to interpret all data as complex data. In addition, CMAC 270 may include multiple data paths that may be run concurrently or separately. In one embodiment, CMAC 270 may include four complex data paths that include multipliers, adders, and accumulator registers (all not shown in FIG. 2). Thus, CMAC 270 may be referred to as a four-way CMAC datapath. In addition to multiplying and adding, CMAC 270 may also perform rounding and scaling operations and support saturation. In one embodiment, CMAC 270 operations may be divided into multiple pipeline steps. In addition, each of the four complex data paths may compute a complex multiplication and accumulation in one clock cycle. The CMAC 270, (i.e., the four data paths together) may execute an operation on an N-element vector in N/4 clock cycles, to support complex vector computing (e.g., complex convolution, conjugate complex convolution and complex vector dot product). The CMAC 270 may also support operations on complex values stored in the accumulator registers (e.g., complex add, subtract, conjugate, etc).

For example, CMAC 270, may compute a complex multiplication such as $(A_R+jA_I)*(B_R+jB_I)$ in one clock cycle and complex accumulation in one clock cycle and support complex vector computing (e.g., complex convolution, conjugate complex convolution, and complex vector dot product).

In one embodiment, as described above, PBBP 145 may include multiple clustered SIMD execution pipelines. More particularly, the datapaths described above may be grouped together into SIMD clusters in which each cluster may execute different tasks while every data path within a cluster may perform a single instruction on multiple data each clock cycle. Specifically, the four-way CALU 280 and the four-way CMAC 270 may function as separate SIMD clusters in which CALU 280 may perform four parallel operations such as four correlations or de-spread of four different codes in parallel, while CMAC 270 performs two parallel Radix-2 FFT butterflies or one Radix-4 FFT butterfly, for example. It is noted that although CALU 280 and CMAC 270 are shown as four-way units, it is contemplated that in other embodiments, they may each include any number of units. Thus, in such embodiments, PBBP 145 may include any number of SIMD clusters as desired. The control path for clustered SIMD operation is described in more detail in conjunction with the description of FIG. 5, below.

The Instruction Set Architecture

In one embodiment, the instruction set architecture for processor core 146 may include three classes of compound instructions. The first class of instructions are RISC instructions, which operate on 16-bit integer operands. The RISC-instruction class includes most of the control-oriented instructions and may be executed within integer execution unit 260 of the processor core 146. The next class of instructions are DSP instructions, which operate on complex-valued data having a real portion and an imaginary portion. The DSP instructions may be executed on one or more of the SIMD-clusters. The third class of instructions are the Vector instructions. Vector instructions may be considered extensions of the DSP instructions since they operate on large data sets and may utilize advanced addressing modes and vector loop support. An exemplary listing of vector instructions is shown below in Table 1. With few exceptions, and as noted, the vector instructions operate on complex data types.

TABLE 1

An exemplary listing of complex vector instructions.

| Mnemonic | Operation |
| --- | --- |
| — | CMAC Vector Instructions |
| MUL | Element-wise vector multiplication or multiply vector by scalar |
| ACC | Sum of the vector elements |
| NACC | Negative Sum of the vector elements |
| VADD | Vector addition |
| VSUB | Vector subtraction |
| FFT | One layer of radix-2 FFT butterflies |
| FFT2 | Two parallel radix-2 FFT butterflies. |
| FFTL | Last layer radix-4 FFT butterfly, used in the last layer of FFT to implement frequency domain filtering. |
| FFT2L | Two parallel radix-2 last layer FFT butterflies |
| R4T | General radix-4 butterfly (DCT, FFT, NTT, . . .) |
| ADDSUB2 | Two parallel "Addition and Subtractions" |

TABLE 1-continued

An exemplary listing of complex vector instructions.

| Mnemonic | Operation |
| --- | --- |
| VMULC | Element-wise multiplication of a constant and vector |
| MAC | Multiply-accumulate (scalar product) |
| NMAC | Negative multiply accumulate |
| WBF | Walsh transform butterfly |
| SQRABS | Element-wise complex square absolute value |
| SQRABSACC | Sum of square absolute values (vector energy) |
| SQRABSMAX | Find largest square absolute value and its index |
| — | Vector Move Instructions |
| VMOVE | Vector Move |
| DUP | Duplicate scalar value to all lanes in a execution unit |
| — | Vector ALU Instructions |
| SMUL | Element-wise short multiplication |
| SMUL4 | Four parallel element-wise short multiplications |
| SMAC | Short multiplication and accumulation (de-spread) |
| SMAC4 | Four parallel short multiplication and accumulations (de-spread) |
| OVSF | N-parallel SMAC with OVSF-codes (multi-code de-spread in CDMA) |
| VADDC | Element-wise add a constant to a vector |
| VSUBC | Element-wise subtract a constant from a vector |

As will be described in greater detail below in conjunction with the description of FIG. 5, the instruction format may include various fields depending on the class of instruction. For example, in one embodiment, RISC instructions may include a unit field, an opcode field and an argument field and vector instructions may additionally include a vector size field.

Figure 3:
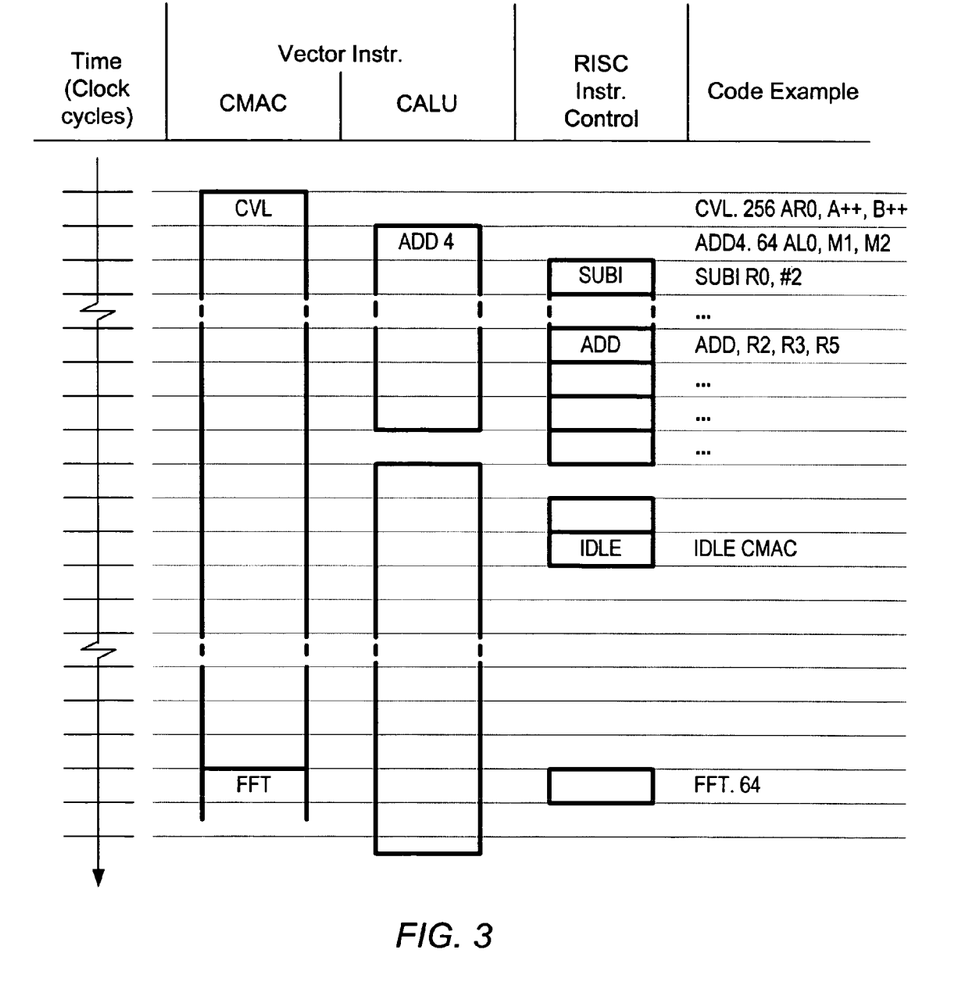
FIG. 3 is a diagram illustrating the instruction issue pipelines of one embodiment of the programmable baseband processor of FIG. 2.

Many baseband-receiving algorithms may be decomposed into task-chains with little backward dependencies between tasks. This property may not only allow different tasks to be performed in parallel on SIMD execution units, it may also be exploited using the above instruction set architecture. Since vector operations typically operate on large vectors, one instruction may be issued every clock cycle, thereby reducing the complexity of the control path. In addition, since vector SIMD instructions run on long vectors, many RISC instructions may be executed during the vector operation. As such, in one embodiment, processor core 146 may be a single instruction issue per clock cycle machine and each of the SIMD clusters and the integer execution unit may execute an instruction each clock cycle in a pipelined fashion. Thus, PBBP 145 may be thought of as running two threads in parallel. The first thread includes program flow and miscellaneous processing using integer execution unit 260. The second thread includes complex vector instructions executed on the SIMD clusters. FIG. 3 illustrates the instruction execution pipelines of one embodiment of the programmable baseband processor of FIG. 2.

Referring collectively to FIG. 2 and FIG. 3, the left column of FIG. 3 represents time (in execution clock cycles). The remaining columns represent the execution pipelines of a complex SIMD cluster (e.g., one datapath of CMAC 270 and CALU 280) and the integer execution unit 260 and the issuance of instructions thereto. More particularly, in the first clock cycle, a complex vector instruction (e.g., CVL. 256) is issued to CMAC 270. As shown, the vector instruction takes many cycles to complete. In the next clock cycle, a vector instruction is issued to CALU 280. In the next clock cycle, an integer instruction is issued to integer execution unit 260. In the next several cycles, while the vector instructions are being executed, any number of integer instructions may be issued to integer execution unit 260. It is noted that although not shown, the remaining SIMD clusters may also be concurrently executing instructions in a similar fashion.

It is noted that in one embodiment, to provide control flow synchronization and to control the data flow, "idle" instructions may be used to halt the control flow until a given vector operation is completed. For example, execution of certain vector instructions by a corresponding SIMD execution unit may allow an "idle" instruction to be executed by integer execution unit 260. The "idle" instruction may halt the integer execution unit 260 until an indication such as a flag, for example, is received from the corresponding SIMD execution unit by integer execution unit 260.

The Hardware Accelerators

As described above, to provide multi-mode support across a wide range of radio standards, many baseband functions may be provided by dedicated hardware accelerators used in combination with a programmable core. For example, in one embodiment one or more of the following functions may be implemented using accelerators 0 through m of FIG. 2: a decimator/filter, a four "finger" RAKE function for use in CDMA and DSSS modulation schemes, a Radix-4 FFT/Modified Walsh transform for use in OFDM modulation schemes and in IEEE 802.11b, a demapper, a Convolutional/Turbo encoder-Viterbi/Turbo decoder, a configurable block interleaver, a configurable scrambler, and a CRC accelerator. It is noted that in other embodiments, other numbers and types of functions may be implemented using accelerators 0 through m.

In one embodiment, the decimator/filter accelerator may include a configurable filter such as a finite impulse response (FIR) filter that may be used for such standards as IEEE 802.11a and others. The four-finger rake accelerator may include a local complex memory for delay path storage, de-spread code generators and a matched filter (all not shown) that may perform multipath search and channel estimation functions. The Radix-4 FFT/Modified Walsh transform (FFT/MWT) accelerator may include a Radix-4 butterfly (not shown) and flexible address generators (not shown). In one embodiment, the FFT/MWT accelerator may perform a 64-point FFT in 54 clock cycles and a modified Walsh transform in support of the IEEE 802.11b standard in 18 clock cycles. The Convolutional/Turbo encoder-Viterbi decoder accelerator may include a reconfigurable Viterbi decoder and a Turbo encoder/decoder to provide support for convolutional and turbo error correcting codes. In one embodiment, decoding of convolutional codes may be performed by the Viterbi algorithm, whereas Turbo codes may be decoded by utilizing a Soft output Viterbi algorithm. A configurable block interleaver accelerator may be used to reorder data to spread neighboring data bits in time, and in the OFDM case, among different frequencies. In addition, the scrambler accelerator may be used to scramble data with pseudo-random data to ensure an even distribution of ones and zeros in the transmitted data-stream. The CRC accelerator may include a linear feedback shift register (not shown) or other algorithm for generating CRC.

The Memory Units

To efficiently utilize the SIMD architecture of processor core 146, memory management and allocation may be important considerations. As such, the data memory system architecture includes several relatively small data memory units (e.g., DM0-DMn). In one embodiment, data memories DM0-DMn may be used for storing complex data during processing. Each of these memories may be implemented to have any number (e.g., four) of interleaved memory banks, which may allow any number (e.g., four) of consecutive addresses (vector elements) to be accessed in parallel. In addition, each of data memories DM0-DMn may include an address generation unit (e.g., Addr. Gen 201 of DM0) that may be configured to perform modulo addressing as well as FFT addressing. Further, each of DM0-DMn may be connected via the network interconnect 250 to any of the accelerators and to the processor core 146. Coefficient memory 215 may be used for storing FFT and filter coefficients, look-up tables, and other data not processed by accelerators. Integer memory 220 may be used as a packet buffer to store a bitstream for the MAC interface 225. Coefficient memory 215 and integer memory 220 are both coupled to processor core 146 via network interconnect 250.

The Network

Network interconnect 250 is configured to interconnect data paths, memories, accelerators and external interfaces. Thus, in one embodiment, network interconnect 250 may behave similar to a crossbar in which the connections may be set up from one input (write-) port to one output (read-) port, and any input port may be connected to any output port in an M×M structure. Although in some embodiments, connections between some memories and some computing units may not be necessary. As such, network interconnect 250 may be optimized to allow certain specific configurations, thus simplifying network interconnect 250. Having an interconnect such as network interconnect 250 may eliminate the need for an arbiter and addressing logic, thus reducing the complexity of the network and the accelerator interfaces, while still allowing many concurrent communications. It is noted that in one embodiment, network interconnect 250 may be implemented using multiplexers or a combinatorial logic structure such as an And-Or structure, for example. However, it is contemplated that in other embodiments, network interconnect 250 may be implemented using any type of physical structure as desired.

In one embodiment, network interconnect 250 may be implemented as two sub-networks. The first sub-network may be used for sample-based transfers and the second sub-network may be a serial network used for bit-based transfers. The division of the two networks may improve the throughput of the networks since bit-based transfers may otherwise require tedious framing and de-framing of data chunks that are not equal to the data width of the network. In such an embodiment, each sub-network may be implemented as a separate crossbar switch that is configured by processor core 146. Network interconnect 250 may also be configured to allow accelerators having associated functionality to be connected directly to each other in a chain and with data memories. In one embodiment, network interconnect 250 may enable the data to flow seamlessly between accelerator units without the intervention of processor core 146, thereby enabling processor core 146 to be involved with the network only during creation and destruction of network connections.

As described above, it may not be necessary to connect all units (e.g., memories, accelerators, etc.) to all other units and network interconnect 250 may be optimized to only allow certain configurations. In those embodiments, network interconnect 250 may be referred to as a "partial network." To transfer data between these partial networks, several memory blocks within one or more data memory units (e.g., DM0) may be assigned to both sub-networks. These memory blocks may be used as ping-pong buffers between tasks. Costly memory moves may be avoided by "swapping" memory blocks between computing elements. This strategy may provide an efficient and predictable data flow without costly memory move operations.

"FIG. 4 illustrates further aspects of the embodiment of the programmable baseband processor of FIG. 2. It is noted that components corresponding to components in FIG. 2 are numbered identically for clarity and simplicity. In the embodiment of FIG. 4, processor core 146 includes a program control unit 310 that is coupled to integer execution unit 260. As described above, integer execution unit 260 includes an ALU 261, a separate multiplier accumulator unit 262 and a set of register files (RF) 263. Complex computing unit 290 includes CMAC execution unit 291 and CALU execution unit 292. CMAC execution unit 291 includes a vector controller 275A that is coupled to a vector load unit 284A, which is in turn coupled to CMAC unit 270. CMAC unit 270 is also coupled to a vector store unit 283A. CALU execution unit 292 includes a vector controller 275B that is coupled to a vector load unit 284B, which is in turn coupled to CALU 280. CALU 280 is also coupled to a vector store unit 283B. It is noted that in one embodiment, CMAC execution unit 291 and CALU execution unit 292 may correspond to SIMD cluster pipelines 295A and 295B, respectively."

In the illustrated embodiment, CALU 280 includes four data paths. Similarly, CMAC 270 also includes four data paths including four CMAC units designated CMAC 276A through 276D. An embodiment of a CMAC datapath is described further below in conjunction with the description of FIG. 7.

Figure 6:
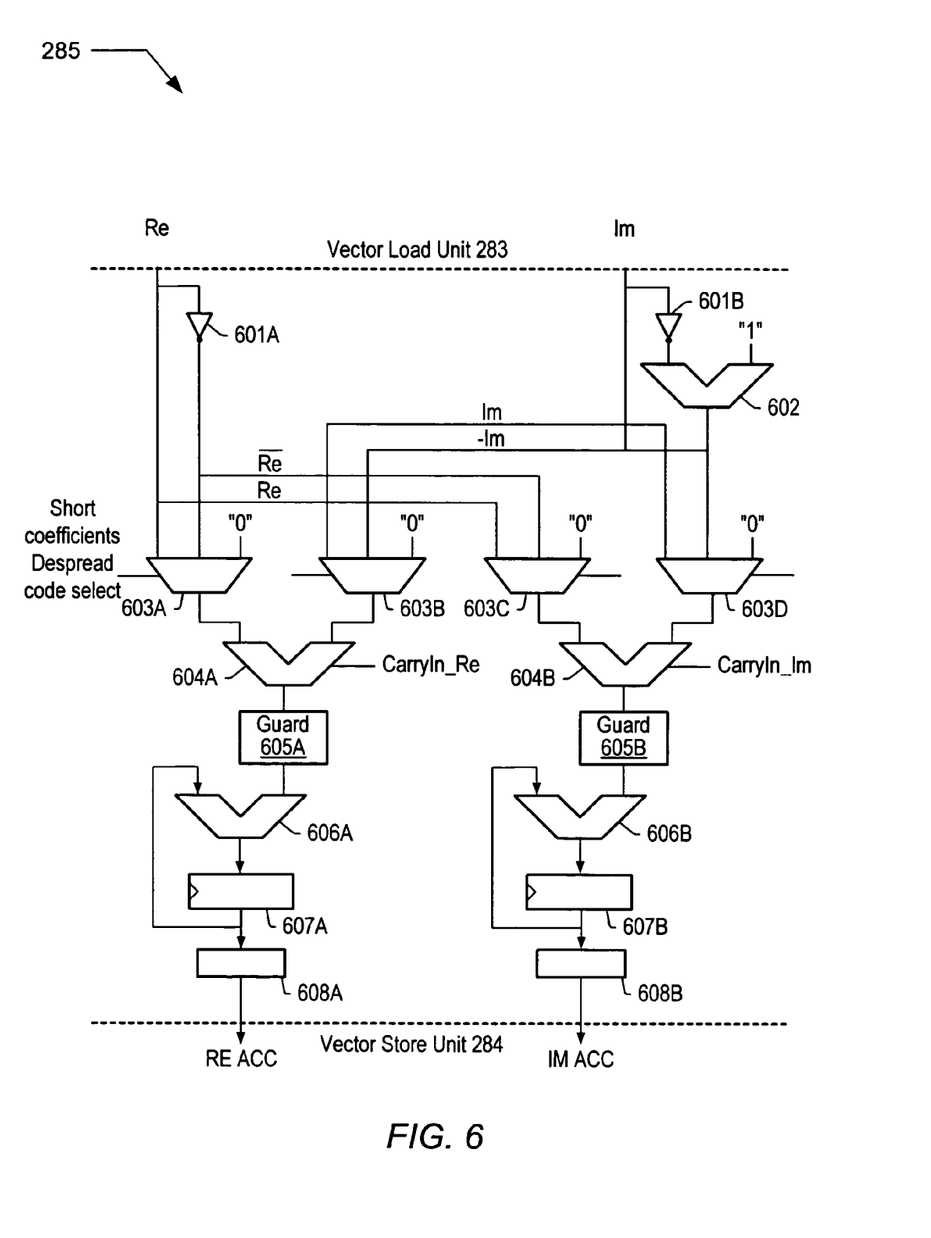
FIG. 6 is a diagram of one embodiment of the complex short MAC datapath of the complex ALU shown in FIG. 4.

Since the CALU 280, along with address and code generators, may be a main component used for such functions as Rake finger processing, by implementing a 4-way CALU with accumulator, either four parallel correlations or de-spread of four different codes may be performed at the same time. These operations may be enabled by adding simple or "short" complex multipliers capable of only multiplying by $\{0, +/-1\}+\{0, +/-i\}$ to the accumulator unit. Thus, in one embodiment, CALU 280 includes four different CSMAC datapaths, which are designated 285A through 285D. An exemplary CSMAC datapath (e.g., CSMAC 285A) is shown in FIG. 6. It is noted that although four datapaths are shown within the CALU 280 and CMAC 270, it is contemplated that in other embodiments, any number of datapaths may be used.

In one embodiment, CSMAC 285 may be controlled from either the instruction word, a de-scrambling code generator or from an OVSF code generator. All subunits may be controlled by vector controller 275A and 275B, which may be configured to manage load and store order, code generation and hardware loop counting.

To relax the memory interface, vector load unit 284 and vector store unit 283 may be employed. Accordingly, in the illustrated embodiment VLU 284 includes storage 281 to relax the memory interface and reduce the number of memory data fetches over the network 250. For example, if four consecutive data items were read from memory, VLU 284 may, in some cases, reduce the number of memory fetches by as much as ¾ by only performing a single fetch operation.

Since the CMAC execution unit 291 includes multiple CMAC units, several concurrent CMAC operations may be performed. As such, each CMAC unit may use one coefficient and one input data item for each operation. Thus, the memory bandwidth for this type of task could be large. However, the instruction set may take advantage of storage 281 within vector load unit 284 by storing a number of previous data items locally. By reordering the data access pattern, the memory access rate may be reduced.

In one embodiment, VLU 284 may act as an interface between the memory (e.g., DM0-n), the network interconnect 250, and the execution units (e.g., VLU 284A is associated with CMAC execution units and VLU 284B is associated with CALU execution units). In one embodiment, VLU 284 may load data using two different modes. In the first mode, multiple data items may be loaded from a bank of memories. In the other mode, data may be loaded one data item at a time and then distributed to the SIMED datapaths in a given cluster. The latter mode may be used to reduce the number of memory accesses when consecutive data are processed by a SIMD cluster.

Figure 5:
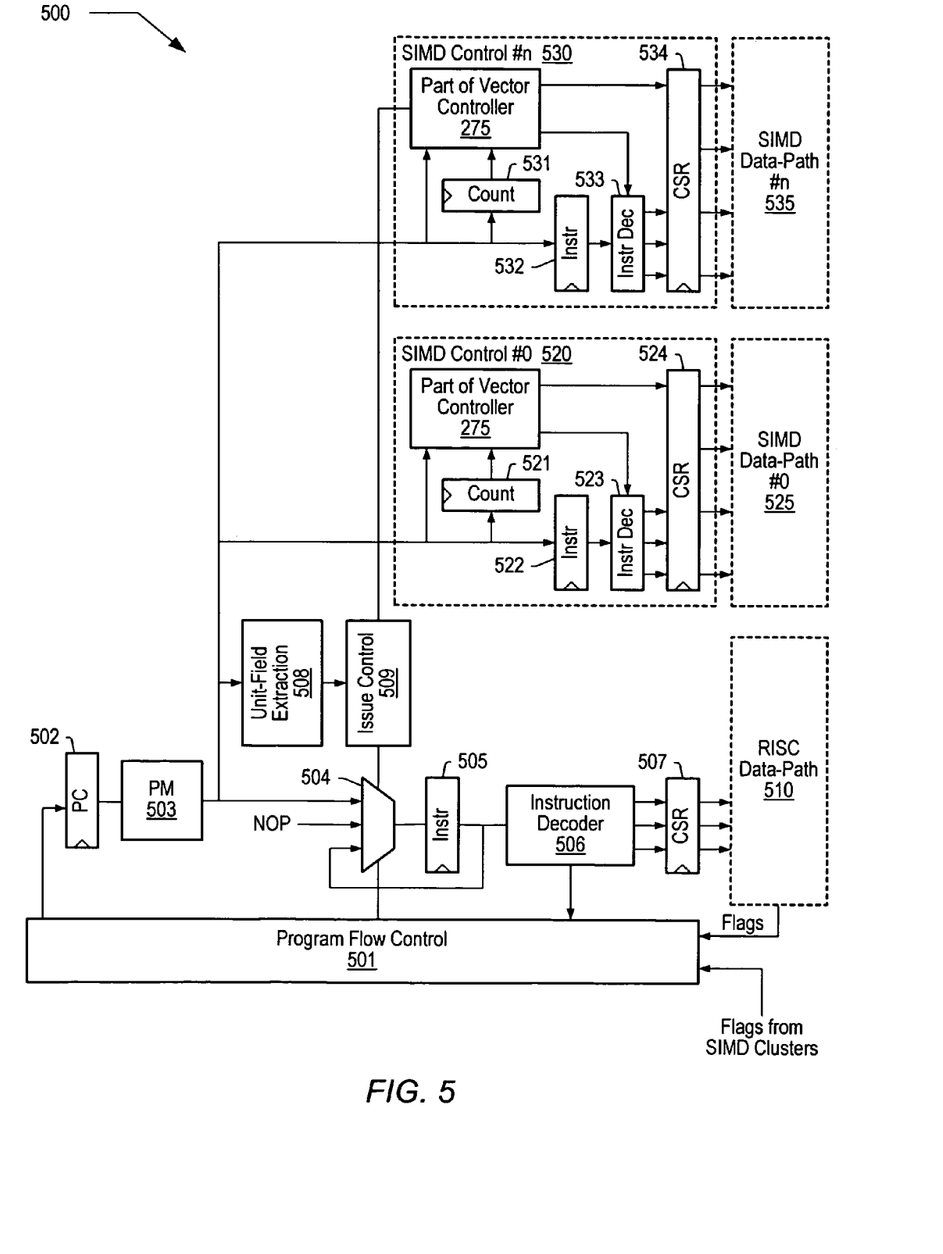
FIG. 5 is a diagram illustrating more detailed aspects of one embodiment of the clustered SIMD control path of the processor core of FIG. 2.

FIG. 5 is a diagram illustrating an exemplary control path of a clustered SIMD processor such as PBBP 145 of FIG. 2 and FIG. 4. PBBP 145 includes processor core 146 which includes a RISC-type execution unit, and which is represented by RISC data path 510, and a number SIMD datapaths represented by SIMD datapath #0 525 and SIMD datapath #n 535. To provide control over the multiple datapaths, the control path hardware 500 includes program flow control 501 coupled to a program counter 502 which is in turn coupled to program memory (PM) 503. PM 503 is coupled to multiplexer 504, unit-field extraction 508, SIMD control 520 and SIMD control 530. Multiplexer 504 is coupled to instruction register 505, which is coupled to instruction decoder 506. Instruction decoder 506 is further coupled to control signal register (CSR) 507, which is in turn coupled to the remainder of the RISC datapath 510. Similarly, each of the SIMD control units 520 and 530 include respective instruction registers (e.g., 522, 532), instruction decoders (e.g., 523, 533), and CSRs (e.g., 524, 534), which are coupled to their respective SIMD clusters (e.g., 525 and 535). It is noted that at least some of the circuits shown in FIG. 5 may be part of program control unit 310 of FIG. 4. For example, in one embodiment, program flow control 501, instruction register 505, decoder 506, control unit 507, unit field extraction 508, and issue control 509 may be part of program control unit 310 of FIG. 4.

As described above, the instruction format may include a unit field. In one embodiment, the unit field in the instruction word may include three bits that represent the unit (e.g., integer execution unit, or SIMD path #1-4) to which the instruction is to be issued. More particularly, the unit field may provide information that enables the issue control unit 509 to determine to which instruction decoder/execution unit the instruction is issued. Every instruction decoder within the execution units may then decode the remaining fields as specified by that unit. This implies that it may be possible to have different organization and size of the remaining fields between the execution units, as desired. In one embodiment, the unit-field extraction unit 508 may remove or strip the unit field before the remaining bits of the instruction word are sent to the respective instruction register/decoder.

In one embodiment, during each clock cycle, one instruction may be fetched from the PM 503. The unit field in the instruction word may be extracted from the instruction word and used to control to which control unit the instruction is dispatched. For example, if the unit field is "000" the instruction may be dispatched to the RISC data-path. This may cause the issue control unit 509 to allow the instruction word to pass through multiplexer 504 into the "instruction register" 505 for the RISC data path, while no new instructions are loaded into the SIMD control units this cycle. If however, the unit field held any other value, the issue control unit 509 may enable the instruction word to pass through into the "instruction register" 522, 532 for the corresponding SIMD control unit and cause a NOP instruction to be sent to the RISC data path instruction register.

In one embodiment, when an instruction is dispatched to the SIMD execution units, the vector length field from the instruction word may be extracted and stored in the count register (e.g., 521, 531) of the corresponding SIMD control unit (e.g., 520, 530). This count register may be used to keep track of the vector length in the corresponding vector instruction. When a corresponding SIMD execution unit has finished the vector operation, the vector controller 275 may cause a signal (flag) to be sent to program flow control 501 to indicate that the unit is ready to accept a new instruction. The vector controller corresponding to each SIMD control unit 520, 530 may additionally create control signals for prolog and epilog states within the execution unit. Such control signals may control VLU 284 for CSMAC operations and also manage odd vector lengths, for example.

As described above, in many baseband-processing algorithms such as in CDMA systems, for example, the received complex data sequence from the antenna is multiplied with a "(de-)spreading code." Thus, there may be a need to element-wise multiply (and accumulate) a complex vector by the de-spreading code, which may be a complex vector containing only numbers from the following set: $\{0, +/-1\} + \{0, +/-i\}$. The result of the complex multiplication is then accumulated. In some conventional programmable processors, this functionality may be performed by executing several arithmetic instructions or by one fully implemented CMAC unit. However, using an N-way CSMAC unit (e.g., CSMAC 285A-D) within a programmable processor, the hardware costs may be reduced.

FIG. 6 is a diagram of an exemplary datapath of the four-way CSMAC unit of the complex ALU shown in FIG. 4. It is noted that CSMAC 285 of FIG. 6 may be illustrative of any of CSMAC 285A through 285D of FIG. 4. CSMAC 285 includes inverters 601A and 601B, four multiplexers designated 603A through 603D. In addition, CSMAC 285 includes several adders designated 602, and 604A, 604B, 606A, and 606B. Further, CSMAC 285 includes two guard units 606A and 606B, two accumulator registers 607A and 607B, and two round/saturate units 608A and 608B.

In one embodiment, CSMAC 285 receives the vector data via VLU 284. The real and imaginary parts follow separate paths, as shown. Depending on the de-spread code that is to be multiplied by the incoming vector data, multiplexers 603A through 603D may allow the corresponding real and imaginary parts and their complement or negated versions to be passed to the adders 604A and 604B, where they are added, sometimes with a carry. Accordingly, depending on the operation, CSMAC 285 may effectively multiply the respective real and imaginary parts by $\{0, +/-1\} + \{0, +/-i\}$ using two's complement arithmetic. The guard units 605A and 605B may be configured to condition the results from adders 604A and 604B. For example, when conditions such as overflows exist, the results may be conditioned to provide a maximum or a minimum (i.e., saturated) value, as desired. Adders 606A and 606B in conjunction with accumulator registers 607A and 607B, may accumulate the respective results, which may be passed to the round/saturate units and on to VSU 283B to be sent to data memory.

Thus from the foregoing description, a conventional multiplier is not used. Instead, two's complement addition is performed, thereby saving die area and power. Thus, a four-way CSMAC such as CSMAC 285A-D may be implemented as an area efficient, four-way CSMAC unit which may perform four parallel CSMAC operations in a programmable environment. The enhanced four-way CSMAC unit can either perform the vector multiplication four times faster than a single unit, or multiply the same vector with four different coefficient vectors. The latter operation may be used to enable "Multi-code de-spread" in CDMA systems. As described above, VLU 284 may duplicate one data item or coefficient item among all data-paths of CSMAC 285 as necessary. The duplication mode may be especially useful when multiplying the same data item with different internally generated coefficients (for example, using OVSF codes).

Figure 7:
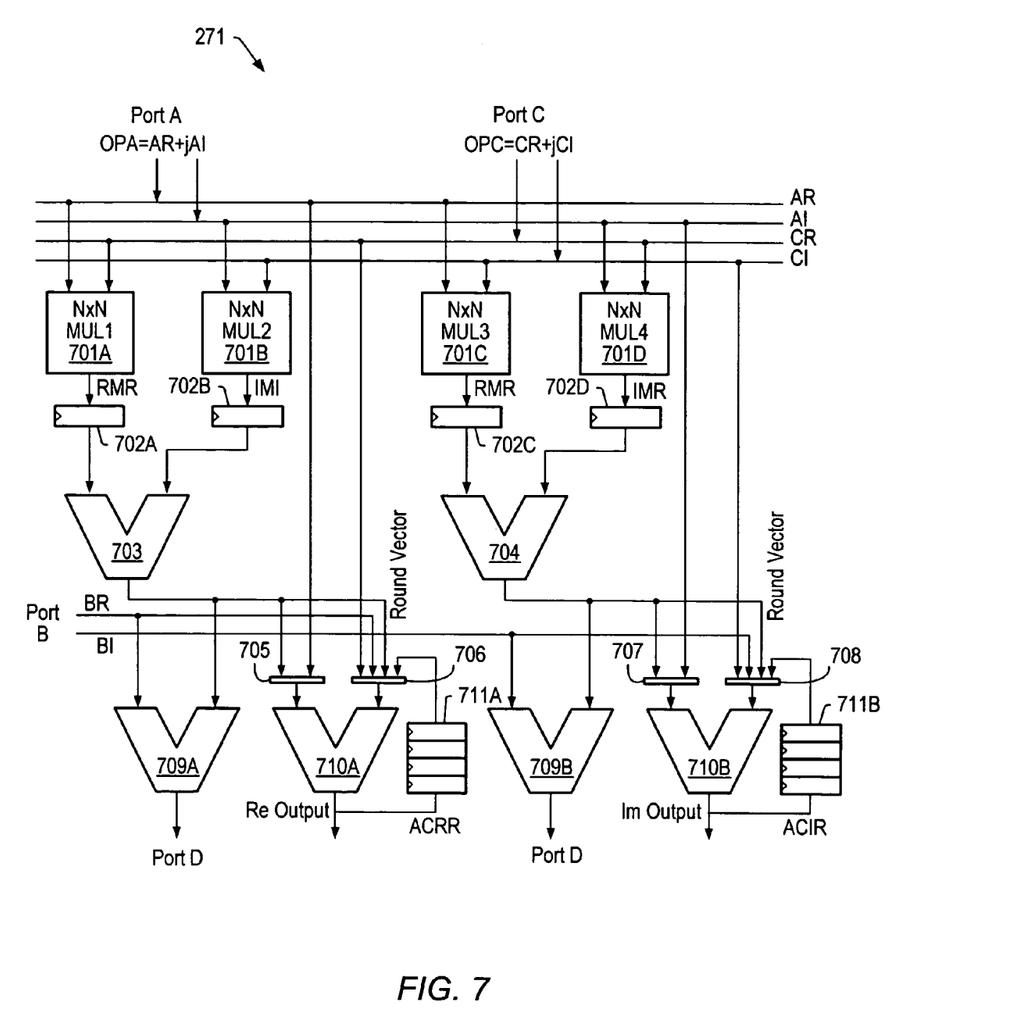
FIG. 7 is a diagram of one embodiment of an exemplary datapath of the complex MAC unit shown in FIG. 4.

FIG. 7 is a diagram of one embodiment of a complex MAC unit datapath shown in FIG. 4. It is noted that CMAC 276 of FIG. 7 may be illustrative of any of CMAC 276A through 276D of FIG. 4. CMAC 276 includes four multi-bit multipliers designated 701A through 701D that are coupled to four respective result registers 702A through 702D. In addition, CMAC 276 includes six full adders designated 703, 704, 709A, 709B, 710A, and 710B. Further, CMAC 276 includes multiplexers 705, 706, 707, and 708, and accumulator registers ACRR 711A and ACIR 711B.

In the illustrated embodiment, multiplier 701A may multiply the real part of operand A with the real part of operand C, while multiplier 701B may multiply the imaginary part of operand A with the imaginary part of operand C. In addition, multiplier 701C may multiply the real part of operand A with the imaginary part of operand C, and multiplier 701D may multiply the imaginary part of operand A with the real part of operand C. The results may be stored in result registers 702A-702D, respectively.

Adder 703 may perform addition and subtraction on the results from multipliers 702A and 702B, while adder 704 may perform addition and subtraction on the results from multipliers 702C and 702D. Multiplexers 705 and 707 may allow a bypass of the multipliers/adders depending on the values of the operands. Depending on the function being performed, multiplexers 706 and 708 may selectively provide values to the accumulator portion, which includes adders 709A, 709B, 710A, and 710B, and accumulator registers ACRR 711A and ACIR 711B. ACRR 711A is the accumulator register for real data and ACIR 711B is the accumulator register for imaginary data.

In one embodiment, CMAC 276 may execute one complex valued multiply-accumulate operation (e.g., a radix-2 FFT butterfly) each clock cycle. It is particularly optimized for operations such as correlation, FFT, or absolute maximum search, for example, that may be performed on vectors of complex numbers (e.g., complex valued in-phase (I) and quadrature (Q) pairs). As described above, processor core 146 has a special class of multi-cycle vector oriented instructions, which can execute in parallel with CALU and RISC/integer instructions. In one embodiment, the complex vector instructions may be 16 bits long, which may provide efficient use of program memory. However, it is contemplated that in other embodiments, the instruction length may be any number of bits.

In one embodiment, when performing complex multiplication or convolution, normal complex computing may be performed when adder 703 performs subtraction and adder 704 performs addition. Complex conjugate computing may be performed when adder 703 performs addition and adder 704 performs subtraction. In addition, when performing either normal complex or complex conjugate multiplication for dot product multiplication and vector rotation, the iterative loop of ACRR 711A and ACIR 711B may be broken and adder 710A and adder 710B may be used for rounding before sending the result to a vector memory with native length. Likewise, when performing complex convolution for complex filters, complex auto-correlation, and complex cross correlation, adder 710A and adder 710B may provide plus or minus accumulation of the real part and the imaginary parts respectively.

In one embodiment, when performing FFT or IFFT computing, the CMAC 276 datapath may give (pipelined) one butterfly computing per clock cycle, (i.e., two points of FFT computing per clock cycle). To execute an FFT, adder 709A and adder 709B perform subtraction and the iterative loop of ACRR and ACIR of adder 710A and adder 710B are broken. In addition, adder 710A and adder 710B perform addition operations.

In one embodiment, to perform the various operations associated with baseband synchronization and data reception described above, the following instructions may be executed on CMAC 276:

CMUL.n: Normal complex multiplication with rounding on results, and executes n steps as a non-overlapped loop. Operands may be supplied from OPA and OPB ports. The result will be on port C with native length complex data format.

CCMUL.n: Complex conjugate multiplication with rounding on results, and executes n steps as a non-overlapped loop. Operands may be supplied from OPA and OPB ports. The result will be provided on port C with native length complex data format.

CMAC.n: Normal complex multiplication and accumulation as a non-overlapped loop executing n steps. Operands may be supplied from OPA and OPB ports. The real part of the result may be stored in ACRR 711A and the imaginary part may be stored in ACIR 711B.

CCMAC.n: Complex conjugate multiplication and accumulation as a non-overlapped loop executing n steps. Operands may be supplied from OPA and OPB ports. The real part of the result may be stored in ACRR 711A and the imaginary part may be stored in ACIR 711B.

FFT.m.n: The $m^{th}$ step of a size n FFT: Complex data may be fetched from Port A, and Port B and complex coefficient may be fetched from port C based on normal in-order addressing; complex data results may be sent to port D using bit-reversal addressing.

It is noted that the flexible nature of the architecture and micro-architecture of PBBP 145 described above may provide support for multiple radio standards and multiple operational modes within those standards.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A digital signal processor comprising:
a plurality of accelerator units, each configured to perform one or more dedicated functions;
a processor core coupled to the plurality of accelerator units, wherein the processor core includes an integer execution unit configured to execute integer instructions; and
a complex computing unit coupled to the plurality of accelerator units, wherein the complex computing unit is configured to execute complex vector instructions;
wherein the complex computing unit includes a first clustered execution pipeline including one or more complex arithmetic logic unit datapaths configured to execute first complex vector instructions, and a second clustered execution pipeline including one or more complex multiplier accumulator datapaths configured to execute second complex vector instructions; and wherein each of the one or more complex arithmetic logic unit datapaths further includes a complex short multiplier accumulator datapath configured to multiply a complex data value by values in a set of numbers defined by $\{0, +/-1\}+\{0,+/-i\}$ using two's complement arithmetic.

2. The processor as recited in claim 1, wherein each datapath within the first and the second clustered execution pipelines is configured to execute a single complex operation, which is part of a vector instruction, per clock cycle.

3. The processor as recited in claim 2, wherein the integer execution unit is configured to execute a single instruction per clock cycle concurrent with execution of any complex vector instructions executed by any of the datapaths within the first and the second clustered execution pipelines.

4. The processor as recited in claim 1, wherein each of the complex multiplier accumulator datapaths is configured to natively interpret any data as complex valued data.

5. The processor as recited in claim 1, wherein each of the first and the second complex vector instructions operate on complex valued data having a real portion and an imaginary portion.

6. The processor as recited in claim 1, wherein the complex computing unit is configured to execute single instruction multiple data (SIMD) instructions.

7. The processor as recited in claim 1, wherein at least some accelerator units of the plurality of accelerator units are configurable hardware implementations of the dedicated functions associated with baseband signal processing.

8. The processor as recited in claim 1, wherein each of the first and the second first clustered execution pipelines further includes a respective vector load unit configured to cause data items to be fetched each clock cycle for use by any datapath in a respective clustered execution pipeline.

9. The processor as recited in claim 8, wherein each vector load unit includes a storage configured to locally store data from a fetch operation performed during a previous clock cycle for use by any datapath in any respective clustered execution pipeline during a subsequent clock cycle.

10. The processor as recited in claim 9, wherein each of the first and the second first clustered execution pipelines further includes a respective vector controller unit coupled to the respective vector load unit and configured to manage load and store order of vector operations by any of the data paths of the first and the second first clustered execution pipelines.

11. The processor as recited in claim 1, wherein given respective functions of the one or more dedicated functions are associated with baseband signal processing corresponding to different wireless communication standards.

12. The processor as recited in claim 1, further comprising a plurality of memory units, wherein each memory unit includes an address generation unit configured to generate an address corresponding to a local memory location in response to receiving a read or write transaction.

13. The processor as recited in claim 12, wherein each of the plurality of memory units, the plurality of accelerator units, the processor core, and the complex computing unit are manufactured on a single integrated circuit.

14. The processor as recited in claim 12, further comprising a network configured to provide connectivity between the plurality of memory units, the plurality of accelerator units, the processor core, and the complex computing unit.

15. The processor as recited in claim 14, wherein in response to execution of particular integer instructions, the network is configured to couple given memory units of the plurality of memory units to one or more of the plurality of accelerator units.

16. The processor as recited in claim 14, wherein in response to execution of particular integer instructions, the network is configured to couple given memory units of the plurality of memory units to the complex computing unit.

17. The processor as recited in claim 14, wherein in response to execution of particular integer instructions, the network is configured to couple together, in a chain, two or more accelerator units of the plurality of accelerator units and to further couple a first accelerator unit of the chain to one of a given one of the plurality of memory units and the complex computing unit.

18. A multimode wireless communication device comprising:

a radio frequency front-end unit configured to transmit and receive radio frequency signals;

a programmable digital signal processor coupled to the radio frequency front-end unit, wherein the programmable digital signal processor includes:

a plurality of accelerator units, each configured to perform one or more dedicated functions; and a processor core coupled to the plurality of accelerator units, wherein the processor core includes an integer execution unit configured to execute integer instructions; and a complex computing unit coupled to the plurality of accelerator units, wherein the complex computing unit is configured to execute complex vector instructions;

wherein the complex computing unit includes a first clustered execution pipeline including one or more complex arithmetic logic unit datapaths configured to execute first complex vector instructions, and a second clustered execution pipeline including one or more complex multiplier accumulator datapaths configured to execute second complex vector instructions; and wherein each of the one or more complex arithmetic logic unit datapaths further includes a complex short multiplier accumulator datapath configured to multiply a complex data value by values in a set of numbers defined by $\{0,+/-1\}+\{0,+/-i\}$ using two's complement arithmetic.

19. The wireless communication device as recited in claim 18, wherein at least some accelerator units of the plurality of accelerator units are configurable hardware implementations of the dedicated functions associated with baseband signal processing.

20. The wireless communication device as recited in claim 18, wherein each datapath within the first and the second clustered execution pipelines is configured to execute a single complex operation, which is part of a vector instruction, per clock cycle.

21. The wireless communication device as recited in claim 20, wherein the integer execution unit is configured to execute a single instruction per clock cycle concurrent with execution of any complex vector instructions executed by any of the datapaths within the first and the second clustered execution pipelines.

22. The wireless communication device as recited in claim 18, wherein each of the complex multiplier accumulator datapaths is configured to natively interpret any data as complex valued data.

23. The wireless communication device as recited in claim 18, wherein each of the first and the second complex vector instructions operate on complex valued data having a real portion and an imaginary portion.

24. The wireless communication device as recited in claim 18, wherein the complex computing unit is configured to execute single instruction multiple data (SIMD) instructions.

25. The wireless communication device as recited in claim 18, wherein each of the first and the second first clustered execution pipelines further includes a respective vector load unit configured to cause data items to be fetched each clock cycle for use by any datapath in a respective clustered execution pipeline.

26. The wireless communication device as recited in claim 25, wherein each vector load unit includes a storage configured to locally store data from a fetch operation performed during a previous clock cycle for use by any datapath in any respective clustered execution pipeline during a subsequent clock cycle.

27. The wireless communication device as recited in claim 26, wherein each of the first and the second first clustered execution pipelines further includes a respective vector controller unit coupled to the respective vector load unit and configured to manage load and store order of vector operations by any of the data paths of the first and the second first clustered execution pipelines.

28. The wireless communication device as recited in claim 18, wherein given respective functions of the one or more dedicated functions are associated with baseband signal processing corresponding to different wireless communication standards.

29. The wireless communication device as recited in claim 18, further comprising a plurality of memory units, wherein each memory unit includes an address generation unit configured to generate an address corresponding to a local memory location in response to receiving a read or write transaction.

30. The wireless communication device as recited in claim 29, wherein each of the plurality of memory units, the plurality of accelerator units, the processor core, and the complex computing unit are manufactured on a single integrated circuit.

31. The wireless communication device as recited in claim 30, further comprising a network configured to provide connectivity between the plurality of memory units, the plurality of accelerator units, the processor core, and the complex computing unit.

32. The wireless communication device as recited in claim 31, wherein in response to execution of particular integer instructions, the network is configured to couple given memory units of the plurality of memory units to one or more of the plurality of accelerator units.

33. The wireless communication device as recited in claim 31, wherein in response to execution of particular integer instructions, the network is configured to couple given memory units of the plurality of memory units to the complex computing unit.

34. The wireless communication device as recited in claim 31, wherein in response to execution of particular integer instructions, the network is configured to couple together, in a chain, two or more accelerator units of the plurality of accelerator units and to further couple a first accelerator unit of the chain to one of a given one of the plurality of memory units and the complex computing unit.

* * * * *